United States Patent
Karlsson

(10) Patent No.: US 6,250,407 B1
(45) Date of Patent: Jun. 26, 2001

(54) ROTARY DRILL BIT HAVING FILLING OPENING FOR THE INSTALLATION OF CYLINDRICAL BEARINGS

(75) Inventor: Lennart Karlsson, Sandviken (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 09/465,319

(22) Filed: Dec. 17, 1999

(30) Foreign Application Priority Data

Dec. 18, 1998 (SE) .................................................... 9804399

(51) Int. Cl.⁷ .................................................... E21B 10/22
(52) U.S. Cl. .............................. 175/371; 175/331; 384/92
(58) Field of Search .................................... 175/331, 371, 175/372, 367; 384/92, 94, 95, 96

(56) References Cited

U.S. PATENT DOCUMENTS

| | | | |
|---|---|---|---|
| 4,256,193 | 3/1981 | Kunkel et al. | 175/371 |
| 4,263,976 * | 4/1981 | Lachonius | 175/370 |
| 4,427,307 * | 1/1984 | Norlander et al. | 384/93 |
| 4,516,640 * | 5/1985 | Karlsson | 175/227 |
| 4,619,534 * | 10/1986 | Daly et al. | 384/94 |
| 6,026,917 * | 2/2000 | Zahradnik et al. | 175/371 |

* cited by examiner

Primary Examiner—David Bagnell
Assistant Examiner—Jennifer Dogherty
(74) Attorney, Agent, or Firm—Burns, Doane, Swecker & Mathis, L.L.P.

(57) ABSTRACT

A rotary drill bit includes a rotary cutter rotatably mounted on a leg. A radial bearing arrangement and an axial bearing arrangement are provided in an interface between the cutter and the leg. The leg includes a filling opening for enabling cylindrical rolling elements of the radial bearing arrangement to be installed. The cutter includes a radial flange which radially overlaps the radial bearing arrangement to secure the cutter on the leg. The flange, which is disposed axially behind the radial bearing arrangement and axially in front of the filling opening, includes a recess for accommodating the passage of the cylindrical rolling elements. A locking element is disposed in the filling opening for preventing dislodgement of the cylindrical rolling elements. The locking element includes a lip which projects axially forwardly of the radial bearing arrangement. The lip is disposed radially inwardly of the flange and terminates axially behind the radial bearing arrangement.

10 Claims, 2 Drawing Sheets

ROTARY DRILL BIT HAVING FILLING OPENING FOR THE INSTALLATION OF CYLINDRICAL BEARINGS

TECHNICAL AREA OF THE INVENTION

The present invention relates to a rotary drilling bit wherein a rotary cutter is mounted on a journal by means of cylinder bearings.

PRIOR ART

A conventional manner to orient the rotary cutter of a rotary drilling bit in the axial direction relative to the journal of the leg is by inserting bearing balls in an interface between the cutter and the journal. The balls are introduced via a filling opening in the journal, whereafter said hole is closed by a locking pin which is welded to the journal. These balls primarily do not have any bearing function but when the main axial bearings (e.g., Stellite® washers) become worn, the balls can be exposed to axial strains, which is not desirable since that can to a substantial degree shorten the life of the rotary cutter bit.

Through U.S. Pat. No. 4,256,193 there is previously known a rotary drilling bit which does not include a number of balls for axial locking of the rotary cutter relative to the journal of the leg. The rotary cutter of said rotary drilling bit has a flange at the area of its open end. Said flange cooperates with cylinder bearings which form a radial bearing situated at the open end of the rotary cutter when the same is mounted on the leg, for securing the rotary cutter in the axial direction relative to the journal. A filling opening is provided in the leg to enable the rolling elements to be installed with the rotary cutter already mounted on the leg. The filling opening passes axially forwardly beyond the flange, without interfering with it (i.e., the filling opening is disposed radially inwardly of the flange) and has a smallest diameter which is somewhat greater than the diameter of the rolling elements that shall be mounted through the filling opening. Since the filling opening is straight, extends parallel to the axial axis of symmetry of the rotary cutter and does not interfere with the flange of the rotary cutter, said filling opening will interfere with the bearing race of the radial bearing situated closest to the open end of the rotary cutter, i.e., the filling opening opens into the bearing race and removes a portion of the same in the circumferential direction. This removed portion must be replaced by a filler piece which is placed in the filling opening when all the rolling elements are assembled at the radial bearing closest to the open end of the rotary cutter. The part of the filler piece that extends axially forwardly of a rear axial end of the radial bearing and that replaces the removed portion of the bearing race must be formed with a curvature that corresponds to the curvature of the bearing race and said part must be mounted with great exactness. Also, there is a risk is that a difference in level may arise at transitions between the filler piece and the bearing race (i.e., there steps are formed between the filler piece and the bearing race if the filler piece is not positioned with exact precision), which naturally impairs the life of the actual radial bearing.

OBJECTS AND SUMMARY OF THE INVENTION

A primary object of the present invention is to provide a rotary drilling bit wherein the rotary cutter is axially secured by a flange on the rotary cutter without cutting into the bearing arrangement of the rotary cutter bit.

Another object of the present invention is to improve the radial bearing arrangement of the rotary cutter bit compared to rotary drilling bits of conventional design.

Still another object of the present invention is to improve the axial bearing arrangement of the rotary cutter bit compared to conventional rotary.

At least the primary object of the present invention is realized by a rotary drilling bit that comprises a leg forming a journal, the journal defining a first axis. A rotary cutter is rotatably mounted on the journal for rotation about the first axis. The cutter carries rock cutting elements. First and second axially spaced radial bearing arrangements are disposed in an interface between the journal and the rotary cutter. Each radial bearing arrangement includes an annular array of cylindrical rolling elements disposed between a radially outer race of the cutter and a radially inner race of the journal. Each rolling element is rotatable about a respective second axis disposed parallel to the first axis. An axial bearing arrangement is arranged in the interface for absorbing axial forces between the rotary cutter and the journal. The leg includes a filling opening arranged substantially parallel to the first axis for enabling the rolling elements of the first radial bearing arrangement to be installed, with the rotary cutter being in a mounted state on the journal. The rotary cutter includes a radial flange arranged to radially overlap the rolling elements of the first radial bearing arrangement for securing the rotary cutter axially on the journal. The flange is disposed axially in front of the filling opening and axially behind the first radial bearing arrangement and includes a recess aligned with a filling opening for accommodating the passage of cylindrical rolling element being installed. A locking pin is disposed in the filling opening for preventing removal of the cylindrical rolling elements of the first radial bearing arrangement. The locking pin includes a lip projecting forwardly past an axial rear end of the flange. The lip is disposed radially inwardly of the flange to avoid blocking rotation of the rotary cutter. The lip terminates axially behind the cylindrical rolling elements of the first radial bearing arrangement.

BRIEF DESCRIPTION OF THE DRAWINGS

The objects and advantages of the invention will become apparent from the following detailed description of preferred embodiments thereof in connection with the accompanying drawings in which like numerals designate like elements and in which.

DETAILED DESCRIPTION OF PREFERRED EMBODIMENTS OF THE INVENTION

Figure 1:
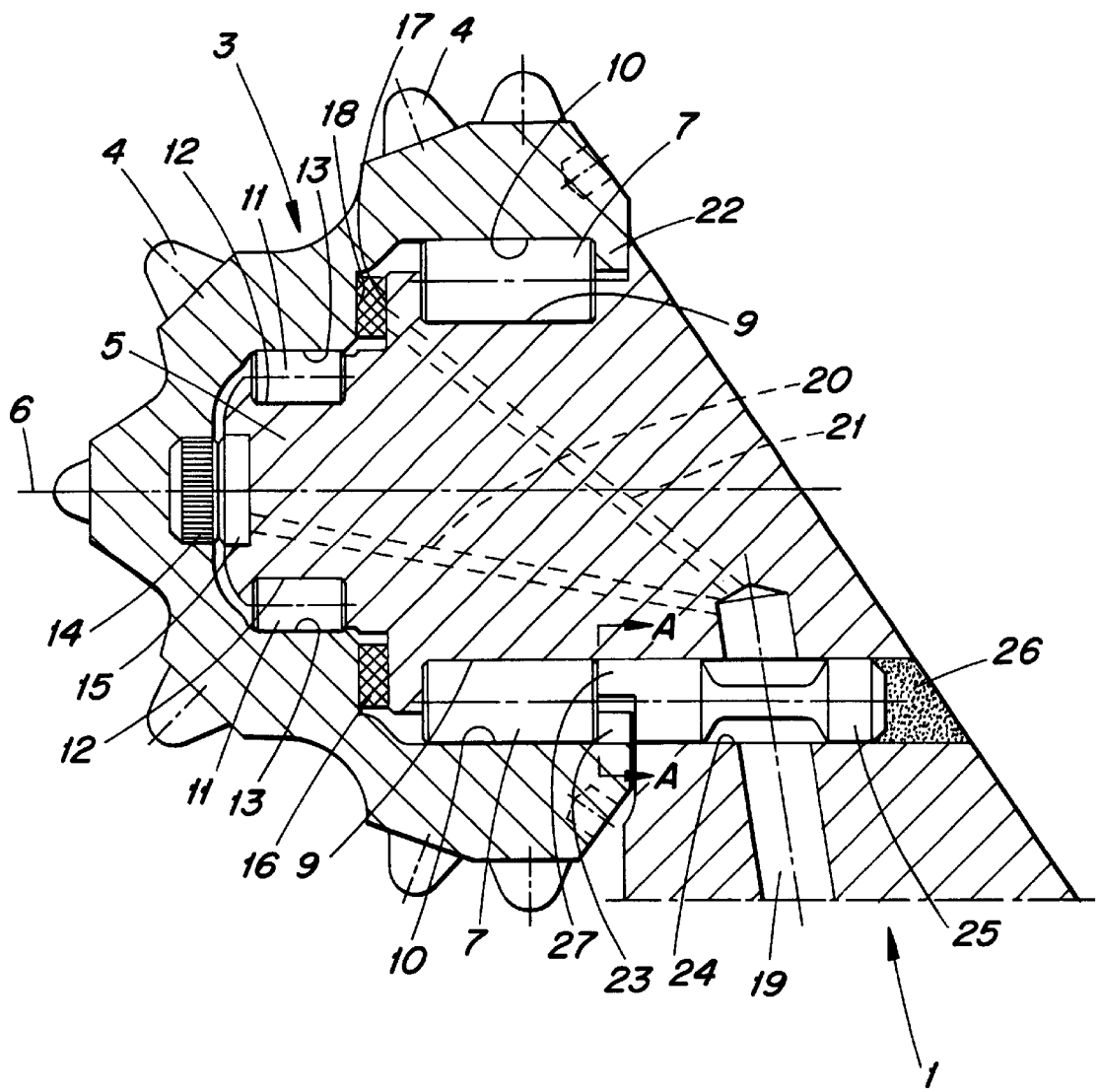
FIG. 1 shows a section through of a first embodiment of a rotary drilling bit according to the present invention.

The rotary drilling bit shown in FIG. 1 is a so-called open rotary drilling bit, which usually is air-cooled. The rotary drilling bit comprises at least one leg 1 and at least one rotary cutter 3. A bearing journal 5 is formed integrally with the leg 1, and the rotary cutter 3 is mounted on the journal 5. In a usual manner the rotary cutter 3 has a number of rock cutting means, preferably in the shape of cemented carbide inserts 4. A number of bearing arrangements are formed between the rotary cutter 3 and the journal 5, and the rotary cutter 3 is symmetrical and rotatable relative to the journal 5 around an axis of rotation 6.

A radial base bearing or rear bearing is provided in connection with the open end of the rotary cutter 3, and said radial base bearing comprises an annular array of cylindrical first rolling elements 7, which cooperate partly with a radially inner first bearing race 9 disposed on the journal and partly with a radially outer second bearing race 10 disposed at the inside of the rotary cutter 3 adjacent the open end of the rotary cutter.

A radial top or front bearing is provided closer to the free end of the journal 5 than to the base bearing, and said top bearing comprises an annular array of cylindrical second rolling elements 11, which normally have a smaller diameter than the rolling elements 7 of the base bearing. The elements 11 are disposed between a third bearing race 12 disposed on the journal 5, and a fourth bearing race 13 disposed at the inside of the rotary cutter 3.

First and second support discs 14 and 15 form a first axial bearing provided adjacent the forward free end of the journal 5. The first support disc 14 is received by a first recess in the rotary cutter 3, and is striated along its circumference for a more secure attachment to said first recess. The material in the first support disc 14 is preferably high-speed steel. The second support disc 15 is received by a second recess at the free end of the journal 5, and the second recess is usually circular while the second support disc 15 is hexagonal or octagonal, whereby the second support disc 15 is prevented from rotating relative to the journal 5. The material in the second support disc 15 is preferably cemented carbide.

A second axial bearing 16 is provided between the base bearing and the top bearing. Since the rotary drill bit according to the present invention does not use balls for axial positioning of the rotary cutter 3 relative to the journal 5 there is more space for a bigger second axial bearing. In the shown embodiment said second axial bearing comprises a so-called floating washer 16, which as is shown in FIG. 1 is situated between a first axial bearing surface 17 of the journal 5 and a second axial bearing surface 18 on the inside of the rotary cutter 3. As an example but without limiting purpose it can be mentioned that in a rotary drilling bit with a diameter of 12¼" (311 mm) the floating washer 16 should have a thickness in the axial direction of at least 4 mm, which is especially important in an air-cooled rotary drilling bit according to the shown embodiment. The material of the floating washer 16 can vary, and as an example but without limiting purpose can be mentioned Stellite®, beryllium copper, aluminum bronzes and special nickel aluminum bronzes.

A cooling channel 19 is provided in the leg 1, which branches into at least one first branch channel 20 and at least one second branch channel 21. The first branch channel 20 terminates in the first axial bearing 14–15 while the second branch channel 21 terminates in the second axial bearing 16.

Figure 2:
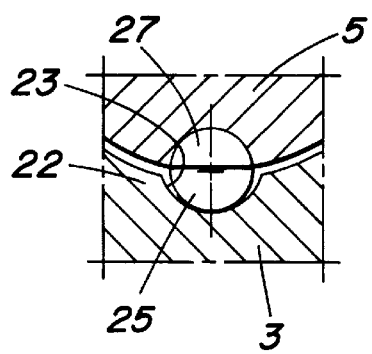
FIG. 2 shows a section along A—A in FIG. 1.

As is shown in FIG. 1 the rotary cutter 3 at its open end is equipped with a flange 22 projecting radially inwardly towards the rotational center of the rotary cutter 3. The flange extends substantially along the entire circumference of the opening of the rotary cutter 3, except however for a short disruption 23, which is shown in FIG. 2. The flange 22 cooperates with the rolling elements 7 in the radial base bearing, i.e., it radially overlaps said rolling elements 7, to prevent axial dislocation of the rotary cutter 3 relative to the journal 5. The flange is disposed axially behind the elements 7 and axially in front of a filling opening 24.

The disruption or recess 23 is necessary to enable mounting of the rolling elements 7 of the radial base bearing. The mounting of said rolling elements 7 is done through the filling opening 24, which extends parallel to the rotational axis 6. The recess 23 substantially constitutes an elongation of the filling opening 24, and the second bearing race 10 is aligned with (i.e., is flush with) a radially outermost portion of the recess 23 which, in turn, is alignable with a radially outermost portion of the filling opening 24.

Furthermore as shown in FIG. 1 a locking pin 25 is received in the filling opening 24 and secured thereto by a weld 26, FIGS. 1 and 2 also show that said locking pin 25 has a protruding, semi-cylindrical lip or heel 27, which substantially occupies only half of the cross section of the locking pin 25. That is, the lip 27 projects forwardly past an axial rear end of the flange 22 and is disposed radially inwardly of the flange 22 to avoid blocking the rotation of the cutter 3. Thereby a free space is formed for the flange 22 when the flange moves past the locking pin 25 during rotation of the cutter 3. The lip terminates axially behind the cylindrical rolling elements 7.

When mounting the rotary cutter 3 on the journal 5, the support discs 14, 15 are fixed in their recesses. Then the floating washer 16 is placed on the journal 5, and the journal 5 is oriented such that the floating washer 16 through gravity rests on the axial bearing surface 17 of the journal 5. The rolling elements 11 of the top bearing are greased and placed in their positions on the journal 5. The rotary cutter 3 is now pushed rearwardly over the journal 5, and the axial bearing and the top bearing are in operational mode between the rotary cutter 3 and the journal 5. The rolling elements 7 of the base bearing cannot be pre-mounted in a corresponding manner as the rolling elements 11 of the top bearing due to the presence of the flange 22 of the rotary cutter 3. The rolling elements 7 are therefore mounted one-by-one forwardly through the filling opening 24, while keeping the recess 23 aligned with said filling opening 24. When all rolling elements 7 of the base bearing have been mounted, the locking pin 25 is inserted, and its lip 27 is brought into abutment against the axial end of the last-inserted rolling element 7, to prevent the rolling elements from exiting said bearing. The locking pin 25 is subsequently fixed in the filling opening 24 by a weld 26. It is obvious through observation of FIG. 1 that despite the provision of the flange 22, there is no need to cut a recess in the first bearing race 9, (e.g., as in U.S. Pat. No. 4,256,193) which obviously is of great significance for extending the life of the base bearing.

The rotary drilling bit according to FIGS. 1 and 2 is thereby ready for operation, and in a usual manner cooling medium, i.e. in this case air, is supplied via channels 19, 20 and 21.

Figure 3:
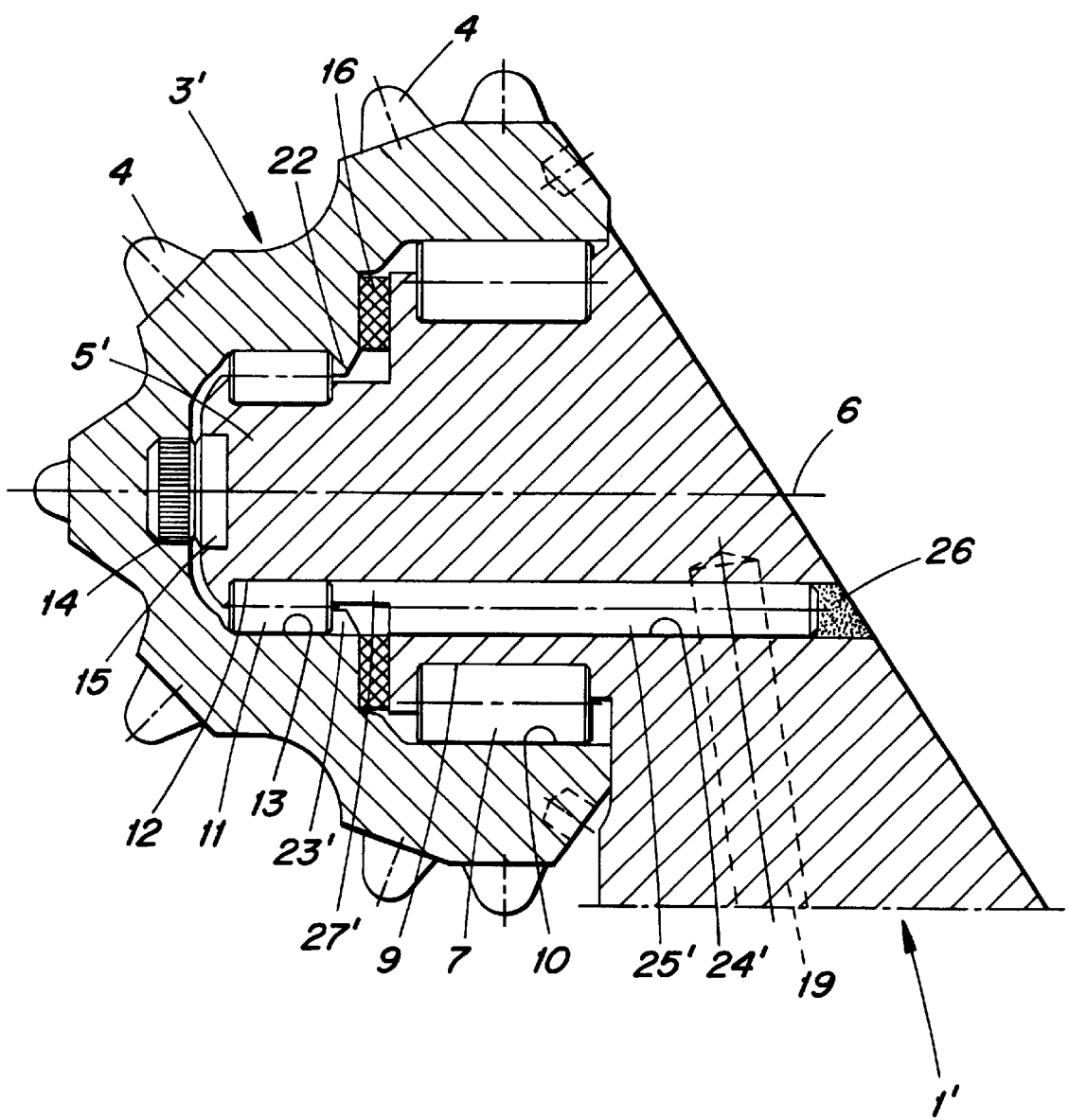
FIG. 3 shows a section through another embodiment of a rotary drilling bit according to the present invention.

The alternative embodiment of a rotary drilling bit according to the present invention shown in FIG. 3 differs substantially from the embodiment according to FIGS. 1 and 2 in that the flange 22' of the rotary cutter 3', instead of being provided in connection with the base (rear) bearing, rather cooperates with the rolling elements 11 of the top (front) bearing to axially secure the rotary cutter 3' relative to the journal 5'. In a corresponding manner as in the embodiment according to FIGS. 1 and 2 the flange 22' has a recess 23', which enables mounting of the rolling elements 11 in the top bearing. The locking pin 25' in the embodiment according to FIG. 3 is longer than the locking pin 25 according to FIG. 1 but otherwise has the same principal design, i.e., it has a lip 27' at its forward end which occupies substantially the half cross-section of the locking pins 25'. In a corresponding manner as at the embodiment according to FIGS. 1 and 2 a filling opening 24' is provided for mounting of the rolling elements 11 and for receiving the locking pin 25'.

Mounting of the rotary cutter 3' on the journal 5' is done substantially in the same manner as mounting the rotary cutter 3 on the journal 5. However the rolling elements 7 of the radial base bearing are mounted in advance on the journal 5' while the rolling elements 11 of the top bearing are mounted afterwards through the filling opening 24'. Also in this case the third bearing race 12, i.e., the bearing race of the journal 5' which is situated in connection with the flange 22', is intact, which brings a normal tool life to the radial top bearing.

In the embodiment shown in FIG. 3 only the main cooling channel 19 is shown, however the embodiment according to FIG. 3 is likewise equipped with branch channels for the cooling medium, and said branch channels terminate at the axial bearings.

Common for both of the embodiments is the omission of balls for the axial locking of the rotary cutter 3,3' relative to the journal 5,5', such as already discussed above, which omission provides added space for the second axial bearing, i.e., the floating washer 16. This increased space makes it possible for the length of the rolling elements 7 and 11 to be longer than in conventional rotary drilling bits having the above-captioned balls. As an example but without limiting purpose it can be mentioned that if the rolling elements 7 are made 6 mm longer in a rotary drilling bit which has a diameter of 12¼" (311 mm), a dynamic bearing capacity of $C_{dyn}$=133.8 kN is obtained, which is about 16% more than in a conventional rotary drilling bit of the same diameter and having axial locking balls. The rolling elements 11 of the exemplified rotary drilling bit can be made 5 mm longer, and a dynamic bearing capacity of $C_{dyn}$=49.45 kN is obtained which is about 10% more than for the above-captioned conventional rotary drilling bit of corresponding diameter.

CONCEIVABLE MODIFICATIONS OF THE INVENTION

The two above-described rotary drilling bits-are so-called open rotary drilling bits, wherein, a pressurized medium, usually air, is blown into the space between the rotary cutter 3,3' and the journal 5,5' such that a certain excess pressure is created in said space. This pressure prevents impurities, for example mud and drill cuttings, from entering into the space to, for example, damage the bearings. However the present invention may also be applicable for so-called sealed rotary drilling bits, wherein a seal is provided at the connection of the open end of the rotary cutter to the leg, whereby impurities are prevented by the seal from entering into the space between the rotary cutter and the journal.

It will be appreciated by those skilled in the art that other additions, deletions, modifications, and substitutions not specifically described may be made without departing from the spirit and scope of the invention as defined in the appended claims.

What is claimed is:

1. Rotary drilling bit comprising:

a leg forming a journal, the journal defining a first axis;

a rotary cutter rotatably mounted on the journal for rotation about the first axis, the cutter carrying rock cutting elements;

first and second axially spaced radial bearing arrangements disposed in an interface between the journal and the rotary cutter, each radial bearing arrangement including an annular array of cylindrical rolling elements disposed between a radially outer race of the cutter and a radially inner race of the journal, each roller element being rotatable about a respective second axis disposed parallel to the first axis;

an axial bearing arrangement arranged in the interface for absorbing axial forces between the rotary cutter and the journal;

the leg including a filling opening arranged substantially parallel to the first axis for enabling the rolling elements of the first radial bearing arrangement to be installed, with the rotary cutter in a mounted state on the journal;

the rotary cutter including a radial flange arranged to radially overlap the rolling elements of the first radial bearing arrangement for securing the rotary cutter axially on the journal, the flange disposed axially in front of the filling opening and axially behind the first radial bearing arrangement and including a recess aligned with the filling opening for accommodating the passage of cylindrical rolling elements being installed; and a locking pin disposed in the filling opening for preventing removal of the cylindrical rolling elements of the first radial bearing arrangement, the locking pin including a lip projecting forwardly past an axial rear end of the flange, the lip disposed radially inwardly of the flange to avoid blocking rotation of the rotary cutter, the lip terminating axially behind the cylindrical rolling elements of the first radial bearing arrangement.

2. The rotary drilling bit according to claim 1 wherein the first radial bearing arrangement is situated axially rearwardly of the second radial bearing arrangement.

3. The rotary drilling bit according to claim 1 wherein the first radial bearing arrangement is situated axially forwardly of the second radial bearing arrangement.

4. The rotary drilling bit according to claim 1 wherein a radially innermost portion of the filling opening is aligned axially with a radially inner race of the first radial bearing arrangement defined by the journal; and wherein a radially outermost portion of the filling opening is aligned axially with a radially outer race of the first cylindrical bearing arrangement defined by the journal.

5. The rotary drilling bit according to claim 1 wherein the axial bearing arrangement comprises a washer.

6. The rotary drilling bit according to claim 5 wherein the washer comprises one of beryllium copper or aluminum bronze.

7. The rotary drilling bit according to claim 5 wherein the washer comprises nickel aluminum.

8. The rotary drilling bit according to claim 5 wherein the bit is configured to drill a bore of a predetermined diameter, the washer having a thickness larger than 1.5% of the predetermined diameter.

9. The rotary drilling bit according to claim 1 wherein the lip is of substantially semi-cylindrical shape.

10. The rotary drilling bit according to claim 9 wherein the recess is of substantially semi-cylindrical shape.

* * * * *